(12) United States Patent
Furihata et al.

(10) Patent No.: US 10,024,653 B2
(45) Date of Patent: Jul. 17, 2018

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Hisayoshi Furihata, Tokyo (JP); Kazuhiko Kobayashi, Yokohama (JP); Masahiro Suzuki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 276 days.

(21) Appl. No.: 14/661,983

(22) Filed: Mar. 18, 2015

(65) Prior Publication Data

US 2015/0268035 A1 Sep. 24, 2015

(30) Foreign Application Priority Data

Mar. 20, 2014 (JP) .................................. 2014-058314
Feb. 9, 2015 (JP) .................................. 2015-023480

(51) Int. Cl.
*H04N 7/18* (2006.01)
*G01B 11/14* (2006.01)
(Continued)

(52) U.S. Cl.
CPC ............ *G01B 11/14* (2013.01); *G01B 11/002* (2013.01); *G01B 11/254* (2013.01); *G06T 7/521* (2017.01)

(58) Field of Classification Search
None
See application file for complete search history.

(56) References Cited

U.S. PATENT DOCUMENTS

| 2007/0091174 | A1* | 4/2007 | Kochi | G01B 11/2509 348/135 |
| 2013/0125408 | A1* | 5/2013 | Atwell | G01B 11/005 33/503 |
| 2013/0129248 | A1* | 5/2013 | Doublet | G06T 3/0031 382/264 |

FOREIGN PATENT DOCUMENTS

| JP | 1-274007 A | 11/1989 | |
| JP | 6-281433 A | 10/1994 | |
| WO | WO2011/051297 A1 * | 10/2010 | ........... G06T 3/0031 |

OTHER PUBLICATIONS

Makoto Kimura et al., "Projector Calibration using Arbitrary Planes and Calibrated Camera", Computer Vision and Pattern Recognition, CVPR, 2007, 2 pages.

(Continued)

*Primary Examiner* — Dakshesh D Parikh
(74) *Attorney, Agent, or Firm* — Canon U.S.A., Inc. IP Division

(57) ABSTRACT

An apparatus that enables measurement of distances to a plurality of planes of an object and plane directions thereof, includes one or more processors that execute instructions to acquire an image of the object on which a projection pattern is projected, the projection pattern being formed by arranging a plurality of line sets at intervals longer than a predetermined value, each of the plurality of line sets having lines arranged at intervals shorter than the predetermined value, detect the lines in the projection pattern from the image, determine the line sets from the detected lines, calculate a distance from a predetermined reference coordinate to a position on a plane of the measurement target object on which a detected line is projected, and calculate a plane direction of a plane of the object on which the line sets are projected, based on the calculated distance.

12 Claims, 8 Drawing Sheets

(51) Int. Cl.
    *G01B 11/00*     (2006.01)
    *G01B 11/25*     (2006.01)
    *G06T 7/521*     (2017.01)

(56) References Cited

OTHER PUBLICATIONS

Roger Y. Tsai, "A Versatile Camera Calibration Technique for High-Accuracy 3D Machine Vision Metrology Using Off-the-Shelf TV Cameras and Lenses", IEEE Journal of Robotics and Automation, vol. RA-3, No. 4, 1987, pp. 323-344.

\* cited by examiner

INFORMATION PROCESSING APPARATUS, INFORMATION PROCESSING METHOD, AND STORAGE MEDIUM

BACKGROUND OF THE INVENTION

Field of the Invention

The present disclosure generally relates to information processing and, more particularly to an information processing apparatus, an information processing method, storage medium, and to a technique for measuring a three-dimensional shape of a surface of a measurement target object by projecting a projection pattern onto the measurement target object and capturing a projection image thereof.

Description of the Related Art

As a measurement algorithm of a three-dimensional sensor, there is a method of projecting a projection pattern onto a measurement target object and measuring a distance to the measurement target object and a plane direction of the measurement target object, from an image obtained by capturing an image of the projected projection pattern. Information on the measured distance and the plane direction can be used for, for example, three-dimensional shape inspection of the measurement target object, model fitting, conversion to a surface shape model (formed by polygon, etc.) and the like.

Japanese Patent Application Laid-Open No. 6-281433 discusses a technique for projecting two lines (hereinafter, a linear light ray projected onto an object is referred to as a "measurement line") onto a measurement target object and measuring a distance to the measurement target object based on a principle of a light-section method. According to Japanese Patent Application Laid-Open No. 6-281433, a plane direction of the measurement target object is calculated by forming a triangle mesh between the two measurement lines used to measure the distance. Here, the triangle mesh formed between the measurement lines is nearly an equilateral triangle, and as the area of the triangle mesh is smaller, a local plane of the measurement target object is well approximated. Therefore, by reducing the space between the measurement lines so as to reduce the area of the triangle mesh formed therebetween, the accuracy in measuring the plane direction increases.

However, according to the method discussed in Japanese Patent Application Laid-Open No. 6-281433 described above, there are only two measurement lines to be projected, and thus there are such shortcomings that it is difficult to obtain the distances to a plurality of planes of the measurement target object and the plane directions of the plurality of planes through a single instance of imaging.

SUMMARY OF THE INVENTION

According to an aspect of the present disclosure, an information processing apparatus includes an acquisition unit configured to acquire a captured image of a measurement target object on which a projection pattern is projected, the projection pattern being formed by arranging a plurality of geometric figure sets each having geometric figures arranged at intervals shorter than a predetermined value, at intervals longer than the predetermined value, a detection unit configured to detect the geometric figures in the projection pattern from the image, a determination unit configured to determine the geometric figure sets from the geometric figures detected by the detection unit, an identification unit configured to identify to which one of the geometric figures in the projection pattern a geometric figure detected by the detection unit corresponds, based on a result of the determination unit, a distance calculation unit configured to calculate a distance from a predetermined reference coordinate to a position on a plane of the measurement target object on which a geometric figure detected by the detection unit is projected, based on a position in the image in the geometric figure detected by the detection unit and a position in the projection pattern in a geometric figure identified by the identification unit, and a plane direction calculation unit configured to calculate a plane direction of a plane of the measurement target object on which a geometric figure set determined by the determination unit is projected, based on the distance calculated by the distance calculation unit.

According to an exemplary embodiment of the present disclosure, the distances to a plurality of planes of the measurement target object and the plane directions of the plurality of planes can be measured through a single instance of imaging.

Further features of the present disclosure will become apparent from the following description of exemplary embodiments with reference to the attached drawings.

DESCRIPTION OF THE EMBODIMENTS

Various exemplary embodiments, features, and aspects of the disclosure will be described in detail below with reference to the drawings.

First of all, a first exemplary embodiment of the present disclosure will be described.

Hereinafter, description will be given of an exemplary embodiment in which distances to a plurality of planes of a measurement target object and plane directions of the plurality of plane are measured through a single instance of imaging. According to the present exemplary embodiment, the distances to the plurality of planes of the measurement target object and the plane directions of the plurality of planes are measured stably, and particularly, the plane directions are measured with high accuracy.

Figure 1:
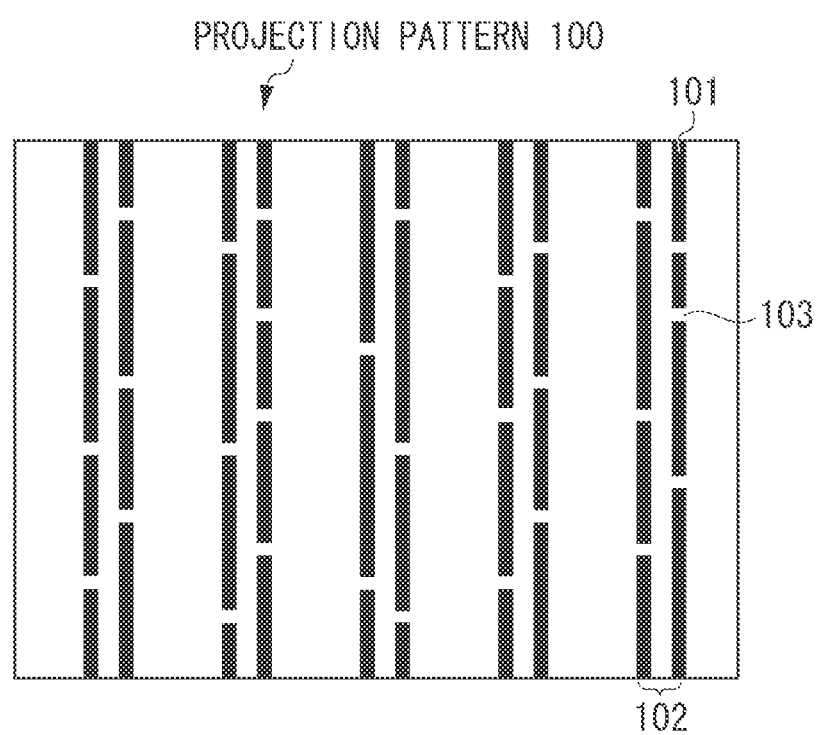
FIG. 1 illustrates an example of a projection pattern to be projected onto a measurement target object according to a first exemplary embodiment of the present disclosure.

FIG. 1 illustrates an example of a projection pattern to be projected onto a measurement target object according to the first exemplary embodiment of the present disclosure.

In the present exemplary embodiment, as illustrated in FIG. 1, a projection pattern 100 is used. The projection pattern 100 is formed by arranging a plurality of geometric figure sets 102 each having geometric figures arranged at intervals shorter than a predetermined value, at intervals longer than the predetermined value. Here, the geometric figures included in the projection pattern 100 are used as markers that are to be detected from an image obtained by projecting the projection pattern 100 onto a measurement target object and capturing an image of the measurement target object while the projection pattern 100 is being projected thereon, for obtaining a correspondence relationship between the projection pattern 100 and the image. In the projection pattern 100 illustrated in FIG. 1, lines (measurement lines 101) are used as the geometric figures.

In the projection pattern 100 illustrated in FIG. 1, sets of the densely arranged geometric figures (hereinafter, referred to as measurement line sets 102) (i.e., geometric figures arranged at intervals shorter than a predetermined value) are arranged so that the plane direction of the measurement target object can be measured with high accuracy.

In a case in which a distance is measured through the light-section method using a projection pattern in which a plurality of measurement lines is arranged, it is necessary to obtain a stereo correspondence relationship between the projection pattern and an image for observing the projection pattern, by identifying to which one of the measurement lines in the projection pattern a measurement line observed in the image corresponds. Therefore, the projection pattern 100 according to the present exemplary embodiment includes identification information for identifying the measurement lines 101 serving as the geometric figures. Specifically, in the present exemplary embodiment, line breaks 103, each serving as an identification feature, arranged at random in the measurement lines 101 are used as the identification information. An identification method of using a break in a measurement line is publicly-known, and the measurement lines 101 are identified, for example, through a method discussed in Japanese Patent Application Laid-Open No. 1-274007.

However, as the measurement line sets are created, the total number of measurement lines in the projection pattern 100 increases (i.e., the number of solution candidates when a measurement line observed in an image is to be identified increases), and thus the identification performance decreases. To address such an issue, in the present exemplary embodiment, by using information on the measurement line sets 102 observed in an image, the solution candidates are narrowed down in such a manner that measurement lines 101 determined to form a measurement line set 102 would be identified as being in the same set. Thus, the identification performance is increased.

To summarize, in the present exemplary embodiment, the projection pattern 100 formed by arranging the plurality of measurement line sets 102 each having the measurement lines 101 arranged at close intervals (i.e., arranged at intervals shorter than a predetermined value), at intervals longer than the predetermined value is projected onto the measurement target object. As a result, distances to a plurality of planes of the measurement target object and plane directions of the plurality of planes can be measured through a single instance of imaging.

Furthermore, in the present exemplary embodiment, the intervals of the measurement lines 101 in the measurement line sets 102 are shorter than the predetermined value, and thus a plane having a small area can be formed with respect to each measurement line 101. Through this, the plane direction of the measurement target object can be measured with high accuracy.

In addition, in the present exemplary embodiment, the measurement lines 101 are identified on a set-by-set basis. Therefore, candidate measurement lines 101 to be identified are narrowed down, and the identification performance is improved. Through this, even if another measurement line set 102 is added, the measurement lines 101 can be identified stably, and thus the distances to a plurality of plane of the measurement target object and the plane directions of the plurality of planes can be measured stably.

Figure 8:
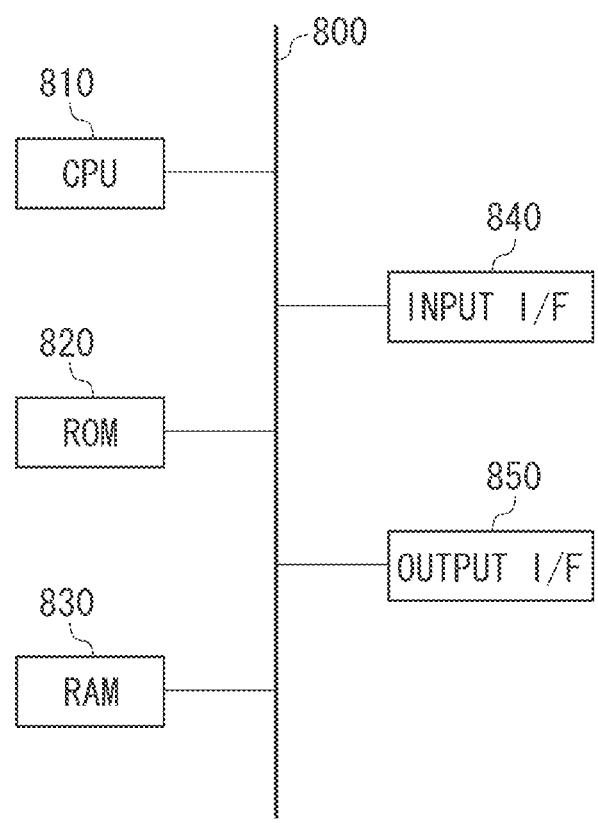
FIG. 8 illustrates an example of a hardware configuration of an information processing apparatus according to an exemplary embodiment of the present disclosure.

FIG. 8 illustrates a hardware configuration of an information processing apparatus 210 according to the present exemplary embodiment. Referring to FIG. 8, a central processing unit (CPU) 810 comprehensively controls each device connected thereto through a bus 800. The CPU 810 reads processing steps or a program stored in a read-only memory (ROM) 820 and executes the read processing steps or program. In addition to an operating system (OS), processing programs, device drivers and so on according to the present exemplary embodiment are stored in the ROM 820. The processing programs and the device drivers are temporarily stored in a random-access memory (RAM) 830 and are executed by the CPU 810, as appropriate. An input interface (I/F) 840 inputs, as an input signal, an image from an external apparatus (e.g., imaging apparatus) in a format that can be processed by the information processing apparatus 210. An output I/F 850 outputs, as an output signal, detected features and so on to an external apparatus in a format that can be processed by the external apparatus. As used herein, the term "unit" generally refers to any combination of software, firmware, hardware, or other component, such as circuitry, that is used to effectuate a purpose.

Figure 2:
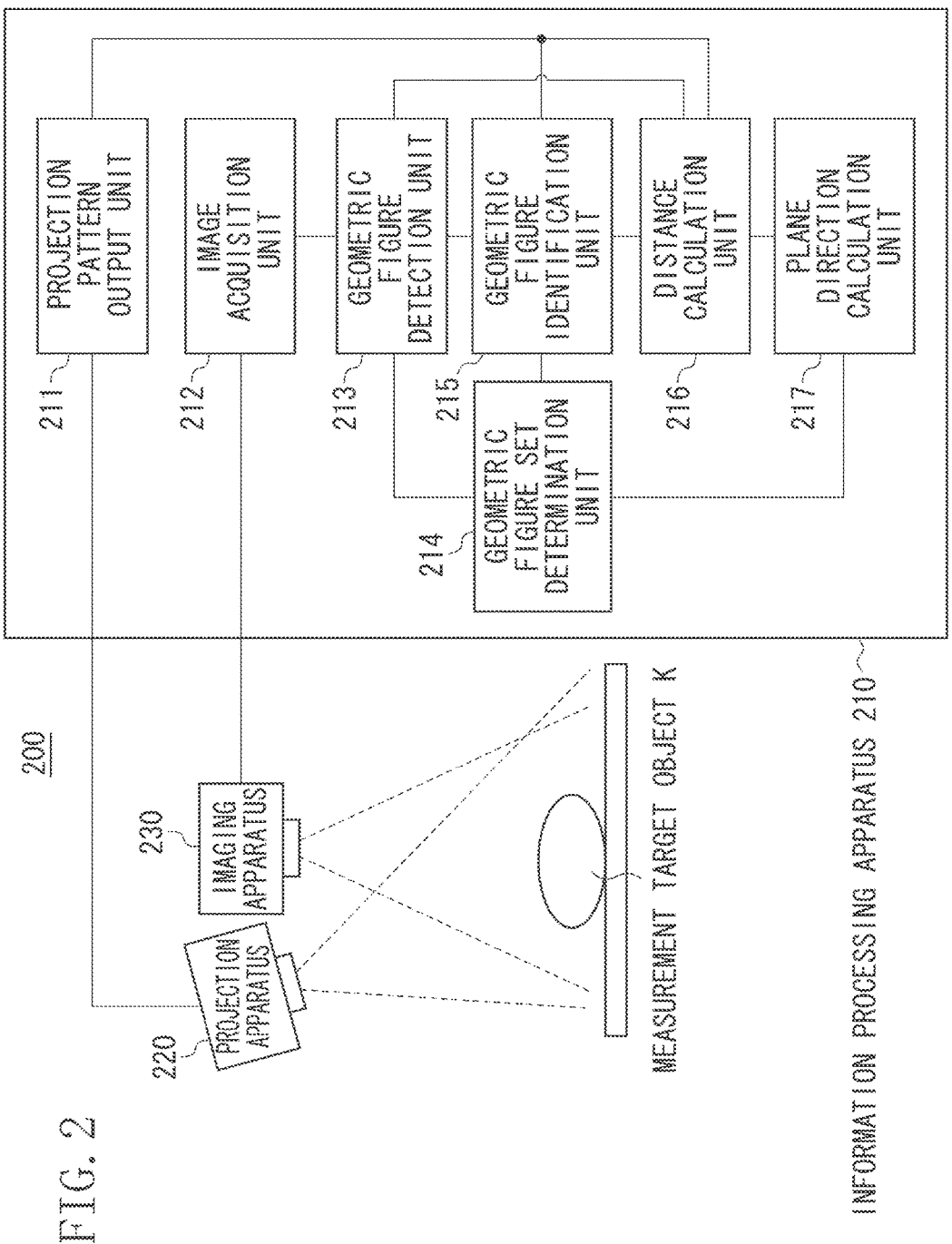
FIG. 2 schematically illustrates a configuration example of an information processing system according to the first exemplary embodiment of the present disclosure.

FIG. 2 schematically illustrates a configuration example of an information processing system according to the first exemplary embodiment of the present disclosure.

As illustrated in FIG. 2, an information processing system 200 according to the present exemplary embodiment includes the information processing apparatus 210, a projection apparatus 220, and an imaging apparatus 230.

In addition, as illustrated in FIG. 2, the information processing apparatus 210 includes a projection pattern output unit 211, an image acquisition unit 212, a geometric figure detection unit 213, a geometric figure set determination unit 214, a geometric figure identification unit 215, a distance calculation unit 216, and a plane direction calculation unit 217.

These functional units are implemented as the CPU 810 loads a program stored in the ROM 820 into the RAM 830 and executes a process in accordance with a flowchart described below. In a case in which hardware is constructed as an alternative to the software process using the CPU 810, for example, a calculation unit or a circuit may be provided so as to correspond to the process of each functional unit described herein.

The projection apparatus 220 is, for example, a projector that projects the projection pattern 100, such as a grayscale pattern, onto a measurement target object K. Internal parameter information such as a focal length, a principal point position, and a lens distortion parameter of the projection apparatus 220, and information on the relative position and orientation of the projection apparatus 220 with respect to the imaging apparatus 230 are calibrated in advance. The calibration method is publicly-known, and may be carried out through a method discussed in the following non-patent literature, for example. M. Kimura, "Projector Calibration using Arbitrary Planes and Calibrated Camera" Computer Vision and Pattern Recognition, CVPR, 2007.

The imaging apparatus 230 is a camera that captures a grayscale image in a state in which the projection pattern 100 is being projected on the measurement target object K by the projection apparatus 220. Internal parameter information such as a focal length, a principal point position, and a lens distortion parameter of the imaging apparatus 230 is calibrated in advance. The calibration method is publicly-known, and may be carried out through a method discussed in the following non-patent literature, for example. R. Y. Tsai, "A versatile camera calibration technique for high-accuracy 3D machine vision metrology using off-the-shelf TV cameras and lenses" IEEE Journal of Robotics and Automation, vol. RA-3, No. 4, 1987.

The projection pattern output unit 211 outputs a projection pattern to be projected onto the measurement target object K, to the projection apparatus 220. In the present exemplary embodiment, as illustrated in FIG. 1, the projection pattern output unit 211 outputs the projection pattern 100 that is formed by arranging the plurality of measurement line sets 102 each having the measurement lines 101 arranged at intervals shorter than a predetermined value, at intervals longer than the predetermined value.

The image acquisition unit 212 acquires, from the imaging apparatus 230, an image (a grayscale image in the present exemplary embodiment) obtained by capturing, with the imaging apparatus 230, an image of the projection pattern 100 being projected on the measurement target object K.

The geometric figure detection unit 213 detects, from the image acquired by the image acquisition unit 212, geometric figures in the projection pattern 100 projected by the projection apparatus 220. Specifically, in the present exemplary embodiment, measurement lines corresponding to the measurement lines 101 illustrated in FIG. 1 are detected as the geometric figures.

The geometric figure set determination unit 214 determines a geometric figure set from the geometric figures detected by the geometric figure detection unit 213. Specifically, in the present exemplary embodiment, a measurement line set corresponding to the measurement line set 102 illustrated in FIG. 1 is detected as the geometric figure set.

The geometric figure identification unit 215 identifies to which one of the geometric figures in the projection pattern 100 a geometric figure detected by the geometric figure detection unit 213 corresponds.

The distance calculation unit 216 calculates a distance from a predetermined reference coordinate to a plane of the measurement target object K on which the geometric figure detected by the geometric figure detection unit 213 is projected, based on the position in the image of the geometric figure detected by the geometric figure detection unit 213 and the position in the projection pattern 100 of the geometric figure identified by the geometric figure identification unit 215. Here, in the present exemplary embodiment, the coordinate of the optical center of the imaging apparatus 230 is applied as an example of the origin of the predetermined reference coordinate. In this case, the distance specifically is the length from the optical center of the imaging apparatus 230 to the plane of the measurement target object K on which the geometric figure observed in the image is projected.

The plane direction calculation unit 217 calculates the plane direction of a plane of the measurement target object K on which the geometric figure set determined by the geometric figure set determination unit 214 is projected, based on the distance calculated by the distance calculation unit 216. More specifically, in the present exemplary embodiment, the plane direction calculation unit 217 calculates, as the plane direction, the normal direction of the plane with reference to the imaging apparatus 230.

Subsequently, processing procedures in the information processing method implemented by the information processing apparatus 210 according to the present exemplary embodiment will be described.

Figure 3:
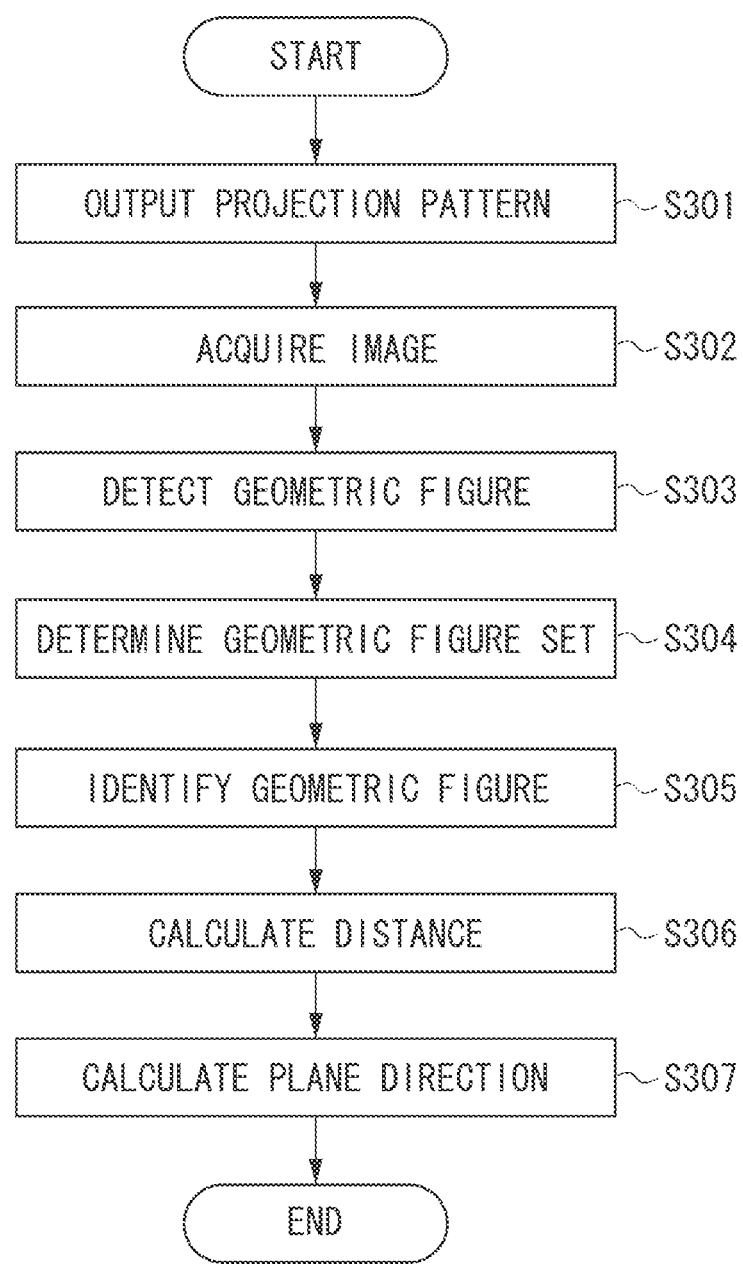
FIG. 3 is a flowchart illustrating an example of processing procedures in an information processing method implemented by an information processing apparatus according to the first exemplary embodiment of the present disclosure.

FIG. 3 is a flowchart illustrating an example of the processing procedures in the information processing method implemented by the information processing apparatus according to the first exemplary embodiment of the present disclosure.

<Step S301>

First, in step S301, the projection pattern output unit 211 outputs the projection pattern 100 to be projected onto the measurement target object K, to the projection apparatus 220. Here, as illustrated in FIG. 1, the projection pattern 100 output from the projection pattern output unit 211 is formed by arranging the measurement line sets 102 each having the measurement lines 101 arranged at close intervals (i.e., arranged at intervals shorter than a predetermined value) so as to measure the plane direction with high accuracy. In addition, as illustrated in FIG. 1, the projection pattern 100 output from the projection pattern output unit 211 includes the line breaks 103, each serving as the identification feature, provided in the measurement lines 101. Thereafter, the projection pattern 100 is projected onto the measurement target object K by the projection apparatus 220.

<Step S302>

Then, after the imaging apparatus 230 captures an image in a state in which the projection pattern 100 is being projected on the measurement target object K, in step S302, the image acquisition unit 212 acquires the image captured by the imaging apparatus 230 from the imaging apparatus 230.

<Step S303>

Subsequently, in step S303, the geometric figure detection unit 213 detects, from the image acquired by the image acquisition unit 212, the geometric figures (measurement lines 101 in the present exemplary embodiment) in the projection pattern 100 projected by the projection apparatus 220. Here, the geometric figure detection unit 213 applies a Sobel filter to the image so as to detect peak positions in the luminance value in the image, and then labels and connects adjacent peak positions among pixels in the image. Thus, the geometric figure detection unit 213 detects a group of pixels having a label count that is equal to or greater than a specific value, as the measurement line 101.

<Step S304>

Subsequently, in step S304, the geometric figure set determination unit 214 determines the geometric figure sets (measurement line sets 102) from the geometric figures (measurement lines 101) detected by the geometric figure detection unit 213. A measurement line 101 observed in the image may include a hidden portion due to recesses and protrusions of the measurement target object K. Therefore, a certain measurement line 101 and another measurement line 101 located near the certain measurement line 101 in the image do not always form a measurement line set 102.

Figure 4:
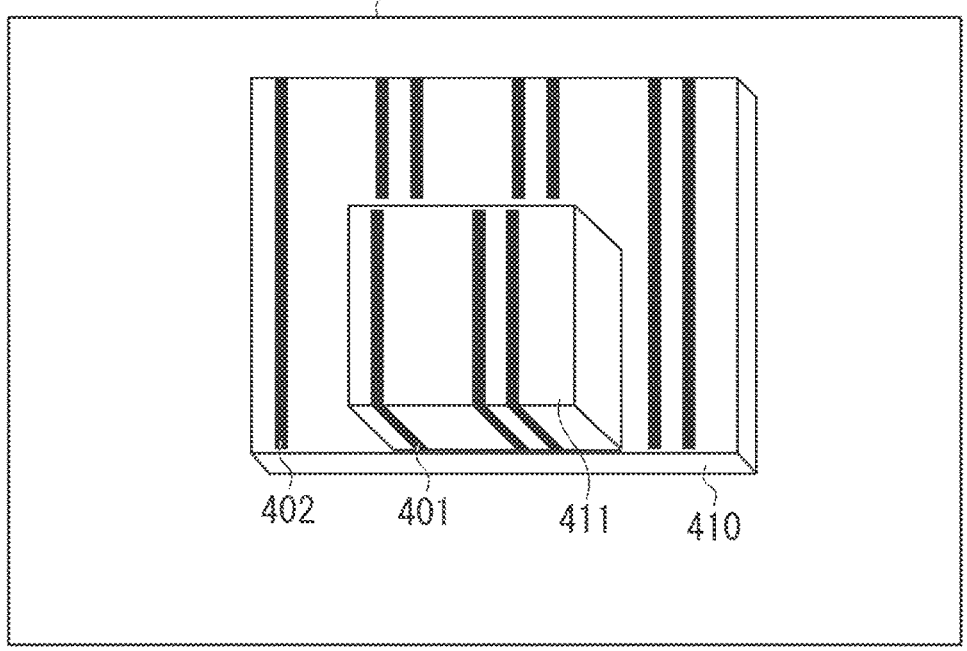
FIG. 4 illustrates an example of a projection image of a projection pattern acquired by an image acquisition unit illustrated in FIG. 2, according to the first exemplary embodiment of the present disclosure.

FIG. 4 illustrates an example of a projection image 400 of a projection pattern, which is acquired by the image acquisition unit 212 illustrated in FIG. 2, according to the first exemplary embodiment of the present disclosure.

The projection image 400 of the projection pattern illustrated in FIG. 4 is an example of an image obtained by projecting a projection pattern formed by arranging measurement line sets each having densely arranged measurement lines onto a measurement target object 410 having a protruding portion 411 formed at a center thereof and by capturing an image of the projected projection pattern. In the example illustrated in FIG. 4, identification features (line breaks 103 illustrated in FIG. 1) of the measurement lines are not pertinent to the explanation of determination of the measurement line sets, and are thus omitted from the drawing.

For example, although a measurement line located near a measurement line 401 in FIG. 4 is a measurement line 402, the measurement line 402 is not a measurement line that forms a set with the measurement line 401 in the projected projection pattern. This situation occurs because another measurement line that forms a set with the measurement line 401 is hidden behind the protruding portion 411. Here, if the measurement line 401 and the measurement line 402 are erroneously determined to form a measurement line set and a triangle mesh is formed between the measurement line 401 and the measurement line 402, a plane is formed across a portion that is actually not even. Thus, a plane direction at a wrong angle is calculated by the plane direction calculation unit 217. In addition, when the geometric figure identification unit 215 identifies the measurement lines, if the determination result of a wrong measurement line set is used, the measurement lines are identified incorrectly. In order to prevent such situations, it is necessary to accurately determine the measurement line set from the measurement lines observed in the image.

Accordingly, in the present exemplary embodiment, for example, by utilizing a feature of a close interval between the measurement lines within a measurement line set (i.e., the intervals are equal to or shorter than a predetermined value), the determination of a certain measurement line and another measurement line near the certain measurement line detected in an image is made in the following manner. Specifically, if the interval between the two measurement lines in the image is shorter than a predetermined threshold value that is based on the predetermined value, the two measurement lines are determined to form a measurement line set. Meanwhile, if the interval between the two measurement lines in the image is not shorter than or equal to the predetermined threshold value, the two measurement lines are determined not to form a measurement line set. The predetermined threshold value used herein may be a fixed value set in advance, or may be a value set based on a statistical value obtained by measuring the intervals of a plurality of measurement lines in an image. In this case, in the method of using the statistical value, under the assumption that the number of samples in which an interval between measurement lines that do not form a set is mixed due to a measurement line being hidden is small, for example, a mean value or a median value of the intervals of the lines may be used as an interval between measurement lines in a representative set, and a predetermined value that contains the representative value may be calculated.

<Step S305>

Subsequently, in step S305, the geometric figure identification unit 215 identifies to which one of the geometric figures (measurement lines 101) in the projection pattern 100 a geometric figure detected by the geometric figure detection unit 213 corresponds. In the present example, the geometric figure identification unit 215 identifies the measurement lines 101 based on the identification features (line breaks 103) in the measurement lines and the measurement line set determination result by the geometric figure set determination unit 214. The identification method based on the breaks in the measurement lines is publicly-known, and the measurement lines are identified through, for example, the method discussed in the above-described Japanese Patent Application Laid-Open No. 1-274007. Specifically, the geometric figure identification unit 215 identifies to which one of the measurement lines in the projection pattern 100 the detected measurement line corresponds, by performing matching on epipolar lines of the projection pattern 100 based on the positions of the breaks in the detected measurement line.

Furthermore, in the present exemplary embodiment, the geometric figure identification unit 215 identifies the measurement lines on a set-by-set basis by using the measurement line set determination result by the geometric figure set determination unit 214, and thus narrows down the solution candidates to be identified. This can prevent such a problem that the total number of measurement lines in the projection pattern increases (i.e., the number of solution candidates increases) as the measurement line sets are formed, and the measurement line identification performance decreases.

For example, the number of measurement lines in a projection pattern is set to 2N. When each measurement line observed in an image is to be identified, a solution is to be estimated from 2N candidates. Meanwhile, if a measurement line set has been determined, the measurement lines can be identified on a set-by-set basis by utilizing a restriction that two measurement lines form a set. In this case, the number of candidates of the determined sets is N (the number of sets in the projection pattern), which is a half of 2N, and thus the measurement lines can be identified stably from a smaller number of candidates.

As a specific identification method of using a measurement line set determination result, the geometric figure identification unit 215 first selects, by using the identification feature, candidates for identifying to which one of measurement lines in the projection pattern 100 each measurement line corresponds. Here, while the possibility that there arises a plurality of solution candidates increases as the number of measurement lines in the projection pattern has increased, the geometric figure identification unit 215 removes a combination of candidates in which two measurement lines are not identified as a set, based on the measurement line set determination result. Through this, the geometric figure identification unit 215 can identify the measurement lines with a limited number of candidates. However, the geometric figure identification unit 215 is unable to use the measurement line set determination result for a measurement line for which another measurement line to form a measurement line set is not found, and thus the geometric figure identification unit 215 identifies such a measurement line by using only the identification information. The geometric figure identification unit 215 identifies the measurement lines on a set-by-set basis through the method described above, and thus the geometric figure identification unit 215 can stably identify the measurement lines with high efficiency.

<Step S306>

Subsequently, in step S306, the distance calculation unit 216 calculates a distance from a predetermined reference coordinate to a position on a plane of the measurement target object K on which the geometric figures detected by the geometric figure detection unit 213 are projected. Specifically, the distance calculation unit 216 calculates the aforementioned distance, based on a principle of the light-section method, from a relationship between the position in the image in the geometric figure detected by the geometric figure detection unit 213 (specifically, the position of each pixel on the measurement line) and the position in the projection pattern in the geometric figure identified by the geometric figure identification unit 215 (specifically, the position of the measurement line on the projection pattern). By carrying out the above-described processing on the entire geometric figures detected by the geometric figure detection unit 213, the distance calculation unit 216 calculates the distances from the predetermined reference coordinate to a plurality of planes of the measurement target object K.

<Step S307>

Subsequently, in step S307, the plane direction calculation unit 217 calculates the plane direction of a plane of the measurement target object K on which the geometric figure set determined by the geometric figure set determination unit 214 is projected, based on the distance calculated by the distance calculation unit 216.

Specifically, in the present exemplary embodiment, the plane direction calculation unit 217 first forms a triangle mesh based on three-dimensional positions indicated by distance values of three points, namely, a point (target point) of each pixel on one of the measurement lines determined as a measurement line set by the geometric figure set determination unit 214, another point on the same measurement line, which is a point adjacent to the target point, and a point on the other measurement line forming the aforementioned measurement line set. Thereafter, the plane direction calculation unit 217 calculates, based on the angles of the formed triangle mesh, the plane direction of the plane (in the present exemplary embodiment, specifically, the normal of the plane) of the measurement target object K on which the aforementioned measurement line set is projected. Then, by carrying out the above-described processing on the points of the pixels on the all measurement lines determined as the measurement line sets by the geometric figure set determination unit 214, the plane direction calculation unit 217 calculates the plane directions of the planes of the measurement target object K on which the measurement line sets are projected.

Upon the processing in step S307 being finished, the processing in the flowchart illustrated in FIG. 3 is terminated.

As described thus far, with the information processing apparatus according to the present exemplary embodiment, the projection pattern formed by arranging the plurality of measurement line sets each having the measurement lines arranged at intervals shorter than a predetermined value, at intervals longer than the predetermined value is projected onto the measurement target object and an image thereof is captured. As a result, the distances to a plurality of planes of the measurement target object and the plane directions of the plurality of planes can be measured through a single instance of imaging. In addition, information on the distance and the plane direction measured in the present exemplary embodiment can be used for, for example, three-dimensional shape inspection of the measurement target object, model fitting, conversion to a surface shape model, and the like. For example, based on the information on the measured distance and the plane direction, it may be inspected whether a predetermined portion of the measurement target object is at a predetermined position and in a predetermined plane direction. In this case, by using the information on the plane direction, inspection regarding angle of the measurement target object can be performed. Alternatively, based on the information on the distance and the plane direction, the presence or absence of defect such as a flaw in the measurement target object may be inspected. If there is a flaw in the measurement target object, the plane direction changes at the location. By utilizing this property, if a portion where the plane direction measured in the present exemplary embodiment changes is measured, the presence or absence of defect such as a flaw can be inspected. Alternatively, based on the information on the measured distance and the plane direction, computer-aided design (CAD) model fitting may be performed by the Iterative Closest Point (ICP) method. Through the model fitting, a point group having the information on the measured distance and the plane direction and a point group of each portion on the CAD model are associated with each other, and the position and orientation of the CAD model is calculated in such a manner that the differences in the three-dimensional position and the plane direction are reduced. In this case, since two types of information, i.e., the distance and the plane direction, are used, information increases. As a result, the position and orientation can be measured with high accuracy. Alternatively, based on the information on the measured distance and the plane direction, the surface shape model formed by polygon may be generated. For example, by connecting points having approximate distances and plane directions to form a triangle mesh, the surface shape model can be generated.

In addition, in the present exemplary embodiment, the distance and the plane direction on the geometric figure projected on the measurement target object are measured through a single instance of imaging. As another method, instead of measuring through a single instance of imaging, measurement may be performed a plurality of times while changing the position of the geometric figure on the pattern. If the position of the geometric figure on the pattern is changed, the position of the geometric figure observed on the measurement target object would change. Accordingly, the distance and the plane direction of a different portion in the measurement target object can be measured. In other words, by performing measurement a plurality of times while changing the position of the geometric figure on the pattern, information on the portion that cannot be acquired through a single measurement can be acquired. Furthermore, by combining measurement results obtained through the plurality of measurements, spatially high-density distances and plane directions can be acquired.

Alternatively, measurement may be performed a plurality of times while changing the relative positions and orientations of the imaging apparatus and the measurement target object. Similarly to the case of changing the position of the geometric figure on the pattern, by changing the relative positions and orientations of the imaging apparatus and the measurement target object, the position of the geometric figure observed on the measurement target object changes. Accordingly, the distance and the plane direction of a different portion in the measurement target object can be measured. At this time, the relative positions and orientations of the imaging apparatus and the measurement target object may be changed by a robot, a turntable, or the like. In this case, the relative positions and orientations can be acquired from a control value of the robot or the turntable.

In addition, the measurement line sets each having the measurement lines arranged at intervals shorter than the predetermined value are projected onto the measurement target object, and thus a plane having a small area can be formed with respect to each measurement line. Through this, the plane direction of a plane of the measurement target object can be measured with high accuracy. Furthermore, as the measurement lines are identified on a set-by-set basis, the solution candidates to be identified can be narrowed down, and the identification performance can be improved. Through this, even if another measurement line set is added, the measurement lines can be stably identified, and thus the distances to a plurality of planes of the measurement target object and the plane directions of the plurality of planes can be stably measured.

The projection apparatus 220 according to the present exemplary embodiment may be any apparatus that projects a two-dimensional projection pattern. For example, the projection apparatus 220 may be a projector that projects a two-dimensional projection pattern, or may be an apparatus in which a light source and a mask pattern are combined. In addition, the projection pattern to be projected may be a grayscale pattern or may be a color pattern.

The image to be acquired by the image acquisition unit 212 may be any image that is a two-dimensional image. For example, the image may be a grayscale image or may be a color image. In addition, the image acquisition unit 212 may acquire an image directly from the imaging apparatus 230, may acquire an image that has once been stored in a memory, or may acquire an image through a network.

The geometric figure detection unit 213 may detect a measurement line through any method that allows the geometric figure detection unit 213 to detect a line from an image. For example, the geometric figure detection unit 213 may detect a measurement line by labeling an edge detected through a Sobel filter, or may detect a measurement line by thinning an image binarized at a specific threshold value.

The plane direction calculation unit 217 may calculate the plane direction through any method that allows the plane direction calculation unit 217 to calculate the plane direction of a plane of the measurement target object K on which a measurement line set is projected. For example, the plane direction calculation unit 217 may calculate the plane direction by forming a triangle mesh from three adjacent points of a measurement line set, or may calculate the plane direction by carrying out plane fitting on distances of a plurality of pixels within each region of a measurement line set.

Furthermore, for example, the distance calculation unit 216 calculates the distances for all the pixels on a measurement line, and the plane direction calculation unit 217 calculates the plane directions for all the pixels on measurement lines that have been determined to form a set. However, the distance and the plane direction do not necessarily need to be calculated for all of the pixels on a measurement line. For example, the distance and the plane direction may be calculated within a specified region in an image, or may be calculated excluding portions of an image at predetermined intervals. In addition, while the plane direction calculation unit 217 calculates the plane direction for measurement lines that have been determined to form a set, the plane direction calculation unit 217 may calculate the plane direction by using two measurement lines other than those forming a set. In this case, although the estimated plane direction may not be highly accurate, the number of plane directions that can be acquired increases.

A modified example 1 of the first exemplary embodiment of the present disclosure will now be described.

In the modified example 1, a variation of the method for identifying a measurement line serving as a geometric figure will be described.

In the first exemplary embodiment described above, the geometric figure identification unit 215 uses the identification feature (line breaks 103) arranged on the measurement lines to identify a measurement line serving as a geometric figure. However, the geometric figure identification unit 215 may identify a measurement line through any method that allows the geometric figure identification unit 215 to identify to which one of the measurement lines in the projection pattern a measurement line observed in an image corresponds.

For example, a code may be assigned to a geometric figure in a projection pattern (here, a code is a figure to be provided to a geometric figure or around a geometric figure, and the break 103 on a measurement line corresponds to a code in the first exemplary embodiment described above), and the geometric figure identification unit 215 may identify a measurement line by using the position of such a code as an identification feature. In this case, as an identification method of using the position of the code as an identification feature, for example, intervals of the positions of the codes arranged in a projection pattern may be varied for the respective measurement lines, and a measurement line may be identified based on the intervals of the positions of the codes observed in an image. Alternatively, a predetermined rule may be assigned to the positions of the codes, and a measurement line may be identified based on the rule of the positions of the codes observed in an image. As a rule for the positions of the codes, for example, the following rule may be employed. Specifically, the codes may be arranged in a geometric figure at intervals based on a de Bruijn sequence or an M-sequence, and when a code in a predetermined region that is observed in an image is found, it is uniquely determined to which one of the codes in the projection pattern that code corresponds.

Figure 5:
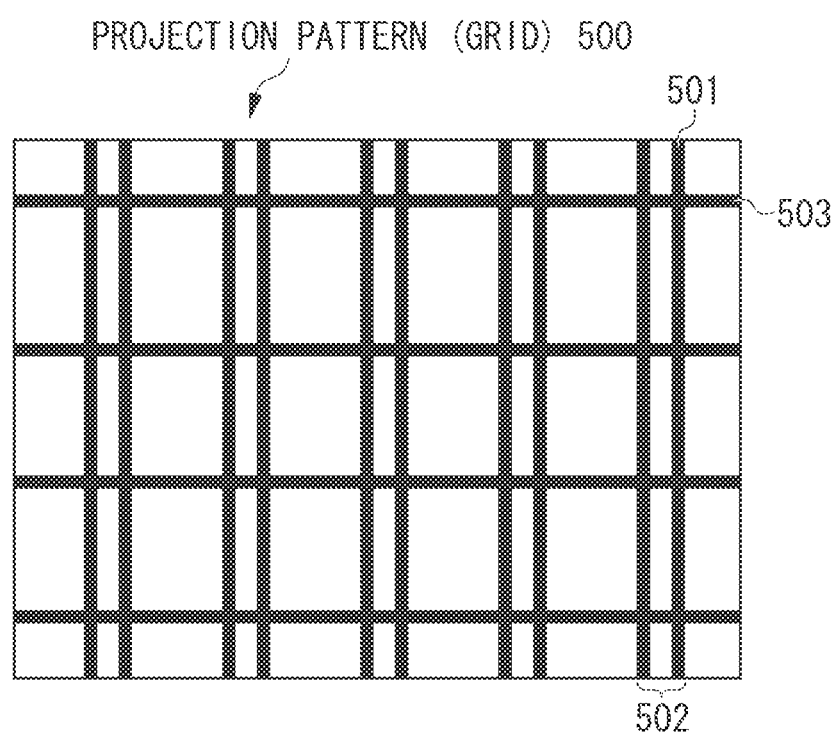
FIG. 5 illustrates an example of a projection pattern to be projected onto a measurement target object according to a modified example 1 of the first exemplary embodiment of the present disclosure.

FIG. 5 illustrates an example of a projection pattern to be projected onto a measurement target object according to the modified example 1 of the first exemplary embodiment of the present disclosure.

As an example of the code other than the break in a measurement line, as in a projection pattern 500 illustrated in FIG. 5, a grid projection pattern in which a plurality of measurement line sets 502 each having the measurement lines arranged at close intervals (i.e., at intervals shorter than a predetermined value) is arranged and a plurality of lines 503 that orthogonally intersects with the measurement lines is further arranged may be used, and a measurement line 501 may be identified based on the positions of intersection points observed in an image. In this case, for example, epipolar lines of the projection pattern 500 are searched through based on the positions of the intersection points of the lines observed in an image, and a matching measurement line is selected. Thus, the measurement line 501 is identified.

Alternatively, the color of a measurement line serving as a geometric figure may be used as an identification feature, and a projection pattern in which the color is varied for the respective measurement lines, for example, may be used. In this case, a measurement line is identified based on the difference in color among the measurement lines observed in an image. As another alternative, in place of the color of the measurement line serving as a geometric figure, the thickness of the measurement line (the size of the measurement line serving as a geometric figure) or the shape of the measurement line may be used as an identification feature, and a measurement line may be identified by varying the thickness or the shape.

As yet another alternative, if the general position and the shape of the measurement target object K are known, a prediction may be made as to where in an image a measurement line projected by the projection apparatus 220 is to be observed, based on the information on the general position and the shape of the measurement target object K, and a measurement line may be identified by calculating a geometric figure at a predicted position near the position of the measurement line detected in the image.

In other words, as a method for identifying a measurement line by the geometric figure identification unit 215, at least one of the identification feature described above and the predicted position described above may be employed as identification information, and the geometric figure identification unit 215 may identify a measurement line based on that identification information.

As described thus far, the geometric figure identification unit 215 may identify a measurement line through any method that allows the geometric figure identification unit 215 to identify to which one of the measurement lines in a projection pattern a measurement line observed in an image corresponds.

Subsequently, a modified example 2 of the first exemplary embodiment of the present disclosure will be described.

In the modified example 2, the geometric figure identification unit 215 identifies a measurement line based on the identification information of a measurement line serving as a geometric figure and the measurement line set determination result by the geometric figure set determination unit 214. In this manner, as the measurement line set determination result by the geometric figure set determination unit 214 is used when the geometric figure identification unit 215 identifies a measurement line, the identification performance can be further improved. However, the measurement line set determination result does not necessarily need to be used, and the geometric figure identification unit 215 may identify a measurement line only by using the identification information. In a case in which the measurement line set determination result is not used in the identification of a measurement line, the identification performance is degraded, but the processing is simplified, and the execution speed of the processing increases. In addition, in this case, a connection between the geometric figure set determination unit 214 and the geometric figure identification unit 215 illustrated in FIG. 2 become unnecessary.

Subsequently, a second exemplary embodiment of the present disclosure will be described.

In the second exemplary embodiment, a variation of the method for determining a measurement line set serving as a geometric figure set will be described.

The geometric figure set determination unit 214 according to the present exemplary embodiment determines a measurement line set based on the intervals of measurement lines detected in an image. However, as the method for determining a measurement line set, a method other than the aforementioned method may be used, and any method may be used as long as the method enables determination of, from among measurement lines observed in an image, measurement lines that form a measurement line set 102 in the projection pattern 100.

In addition, in the present exemplary embodiment, a set determination feature for determining a measurement line set may be provided in a measurement line serving as a geometric figure in a projection pattern. In this case, the geometric figure set determination unit 214 determines whether a certain measurement line detected by the geometric figure detection unit 213 and another measurement line located near the certain measurement line form a measurement line set, according to whether the set determination features provided in the certain measurement line and the other measurement line located near the certain measurement line follow a predetermined rule.

Figure 6:
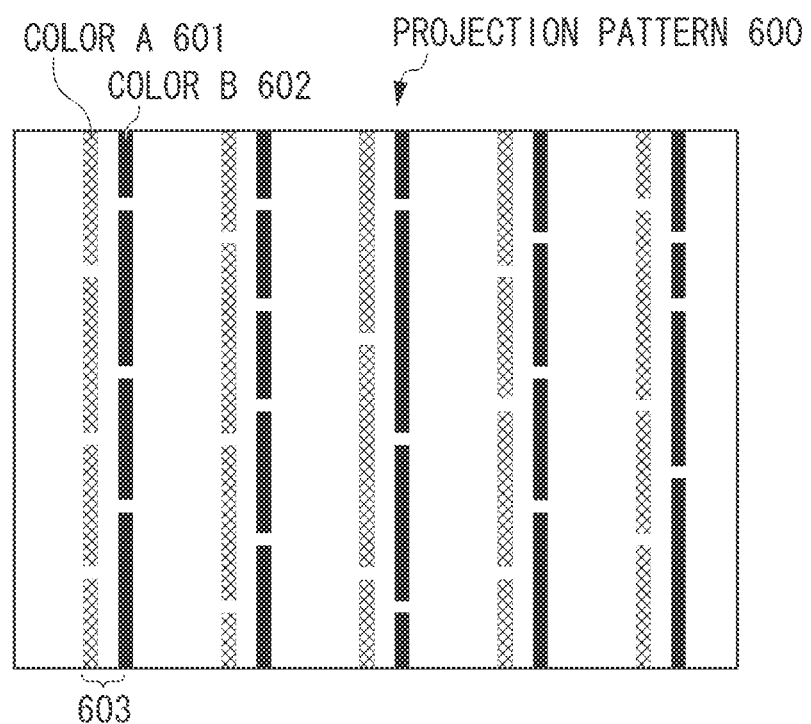
FIG. 6 illustrates an example of a projection pattern to be projected onto a measurement target object according to a second exemplary embodiment of the present disclosure.

FIG. 6 illustrates an example of a projection pattern to be projected onto a measurement target object according to the second exemplary embodiment of the present disclosure.

In the example illustrated in FIG. 6, colors serving as a set determination feature are added to the measurement lines. A projection pattern 600 includes measurement line sets 603 each having measurement lines of different colors, namely, a measurement line 601 of color A and a measurement line 602 of color B forming a measurement line set. By using this rule, if the order of the colors of adjacent measurement lines observed in an image follows the rule, the geometric figure set determination unit 214 may determine that measurement lines form a measurement line set, or if the order of the colors does not follow the rule, it may determine that measurement lines do not form a measurement line set.

Alternatively, a projection pattern may be designed in such a manner that two measurement lines that form a measurement line set have an identical color, and the geometric figure set determination unit 214 may determine whether measurement lines form a measurement line set, based on whether the colors of the adjacent measurement lines observed in an image are identical to each other. As another alternative, as a set determination feature, in place of the color of the measurement line serving as a geometric figure, for example, the thickness of the measurement line (the size of the measurement line serving as a geometric figure) or the shape of the measurement line may be used, and a measurement line set may be determined by varying the thickness or the shape. In this case, for example, one of the measurement lines forming a measurement line set may be a thin line, and the other measurement line may be a thick line. Then, it may be determined whether measurement lines form a measurement line set, according to whether the order of thickness of the measurement lines observed in an image is in a set order.

As yet another alternative, as a set determination feature, the position of a code in a measurement line serving as a geometric figure may be employed. Specifically, codes may be arranged in measurement lines by a predetermined rule, and it may be determined whether measurement lines form a measurement line set, according to whether the codes observed in an image follow the predetermined rule. In this case, as a rule for determining a measurement line set, for example, codes may be arranged in measurement lines forming a measurement line set at identical positions (identical positions in a direction along the lines), and it may be determined whether measurement lines form a measurement line set, according to whether the codes in the measurement lines observed in an image are located at identical positions.

As yet another alternative, an identification feature described in the first exemplary embodiment (specifically, the line break 103) may be used as a set determination feature. For example, adjacent measurement lines may be identified based on the identification features of the respective measurement lines. Then, if there is a candidate of an identification result indicating that the two measurement lines belong to the same set, the two measurement lines may be determined to form a measurement line set, and if there is no such a candidate, the two measurement lines may be determined not to form a measurement line set.

Furthermore, the geometric figure set determination unit 214 may determine whether a certain measurement line detected by the geometric figure detection unit 213 and another measurement line located near the certain measurement line form a measurement line set, according to whether a geometric non-continuous portion (uneven portion) of the measurement target object K is absent in an image region between the certain measurement line and the other measurement line located near the certain measurement line.

Specifically, first, the geometric figure set determination unit 214 applies a Sobel filter to the image so as to detect an edge in the image, and then calculates the number of edges in the image region between the certain measurement line detected from the image and the other measurement line located near the certain measurement line. The geometric figure set determination unit 214 then determines that there is no unevenness between the two measurement lines if, for example, the calculated number of edges is smaller than a predetermined number, and determines that the two measurement lines form a measurement line set. Meanwhile, the geometric figure set determination unit 214 determines that there is unevenness between the two measurement lines if, for example, the calculated number of edges is equal to or greater than the predetermined number, and determines that the two measurement lines do not form a measurement line set.

Alternatively, the geometric figure set determination unit 214 may calculate a variation in a luminance value (e.g., variance in the luminance value) in the image region between the two measurement lines. Then, the geometric figure set determination unit 214 may determine that the two measurement lines form a measurement line set if the variation is less than a predetermined value, or may determine that the two measurement lines do not form a measurement line set if the variation is equal to or greater than the predetermined value.

As another alternative, the geometric figure set determination unit 214 may calculate a variation in a distance value (e.g., variance in the distance value) in the image region between the two measurement lines from distance information obtained from the measurement target object K. Then, the geometric figure set determination unit 214 may determine that the two measurement lines form a measurement line set if the variation is less than a predetermined value, or may determine that the two measurement lines do not form a measurement line set if the variation is equal to or greater than the predetermined value. In this case, the calculation result of the distance calculation unit 216 may be used as the distance information, or the distance information may be separately obtained by using a three-dimensional sensor. Alternatively, another imaging apparatus may be added, and the distance information may be calculated through stereo matching with the imaging apparatus 230.

Subsequently, a third exemplary embodiment of the present disclosure will be described.

In the third exemplary embodiment, description will be given of a variation of a geometric figure in which, as a geometric figure in a projection pattern, in place of the measurement line described in the first and second exemplary embodiments above, a different geometric figure is used.

In the first and second exemplary embodiments described above, an example in which a measurement line is used as a geometric figure has been described. However, a geometric figure to be projected onto the measurement target object K does not need to be a measurement line as long as a certain geometric figure can be detected and identified in an image. Here, as a geometric figure, a dot may be used, or a rectangular or triangular figure may be used.

Figure 7:
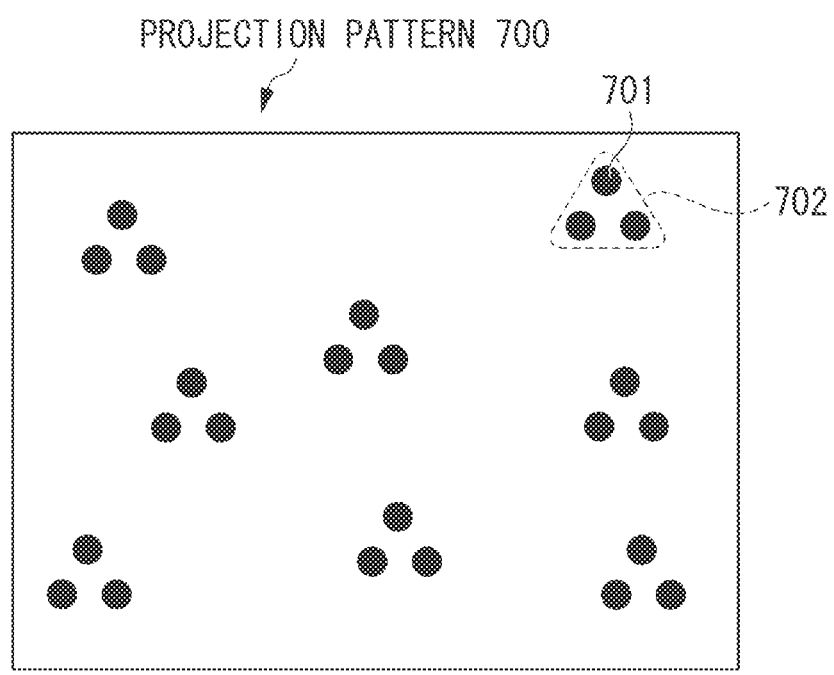
FIG. 7 illustrates an example of a projection pattern to be projected onto a measurement target object according to a third exemplary embodiment of the present disclosure.

FIG. 7 illustrates an example of a projection pattern to be projected onto a measurement target object according to the third exemplary embodiment of the present disclosure.

For example, as illustrated in FIG. 7, a dot (measurement dot) 701 is used as a geometric figure, and a projection pattern 700 formed by arranging a plurality of measurement dot sets 702 each having the measurement dots 701 arranged at close intervals (i.e., at intervals shorter than a predetermined value), at intervals longer than the predetermined value may be used. In the projection pattern 700 illustrated in FIG. 7, the number of the measurement dots 701 in each measurement dot set 702 is three so that a precise plane direction can be measured by each set.

The measurement dot 701 observed in an image may be detected through any method that allows the position of a geometric feature in an image to be measured. For example, the measurement dot 701 may be detected by calculating a centroid of an image that has been binarized at a predetermined threshold value, or the measurement dot 701 may be detected by carrying out circle detection in an image.

In addition, as in the method for determining a measurement line set described in the first exemplary embodiment, a method for determining a measurement dot set observed in an image may be any method as long as the method enables determination of, from the measurement dots observed in an image, the measurement dot set 702 in the projection pattern 700. For example, it may be determined whether a certain measurement dot detected in an image and another measurement dot located near the certain measurement dot form a measurement dot set, according to whether the interval between the certain measurement dot and the other measurement dot is less than a predetermined threshold value that is based on the predetermined value. Alternatively, a set determination feature for determining a measurement dot set may additionally be provided in a projection pattern, and a measurement dot set may be determined based on the set determination feature. As another alternative, a measurement dot set may be determined according to whether there is unevenness between a certain measurement dot detected in an image and another measurement dot located near the certain measurement dot.

In addition, as in the method for identifying a measurement line described in the first exemplary embodiment above, a method for identifying a measurement dot may be any method that allows a measurement dot to be identified. For example, epipolar lines in the projection pattern 700 may be searched through based on the position of a measurement dot observed in an image, and the measurement dot may be identified by carrying out matching with the position of the measurement dot in the projection pattern. Alternatively, for example, a plurality of colors may be provided to the measurement dots in the projection pattern, and a measurement dot may be identified based on the difference in color of the measurement dots observed in an image. As another alternative, if the general position of the measurement target object K is known, a prediction may be made as to where in an image a measurement dot projected by the projection apparatus 220 is to be observed, based on the information on the general position, and a measurement dot may be identified by obtaining a geometric figure at a predicted position adjacent to the measurement dot observed in the image.

As yet another alternative, as a method for identifying a measurement dot, a measurement dot may be identified by narrowing down the solution candidates so that measurement dots that have been determined to be in the same set form a measurement dot set in the projection pattern 700, based on a measurement dot set determination result by the geometric figure set determination unit 214.

While the number of the measurement dots in a measurement dot set is three in the present exemplary embodiment, the number of the measurement dots may be two. In this case, when the plane direction of a plane of the measurement target object K on which a measurement dot set is projected is calculated, the plane direction is calculated by using a nearby measurement dot outside the aforementioned measurement dot set, and thus the accuracy in calculating the plane direction may decrease.

As described thus far, a geometric figure to be projected onto the measurement target object K may be any geometric figure that can be detected and identified in an image.

According to the exemplary embodiments of the present disclosure, the projection pattern formed by arranging a plurality of geometric figure sets each having the geometric figures arranged at close intervals (i.e., at intervals shorter than a predetermined value), at intervals longer than the predetermined value is projected onto the measurement target object, and an image thereof is captured. Thus, the distances to a plurality of planes of the measurement target object and the plane directions of the plurality of planes can be measured through a single instance of imaging.

In addition, the geometric figure sets each having the geometric figures arranged at intervals shorter than the predetermined value are projected onto the measurement target object, and thus a plane having a small area can be formed with respect to each measurement line. Through this, the plane direction of a plane of the measurement target object can be measured with high accuracy. Furthermore, the geometric figures are identified on a set-by-set basis. Thus, the number of solution candidates to be identified can be narrowed down, and the identification performance can be improved. Through this, even if another geometric figure set is added, the geometric figures can be identified stably. Accordingly, the distances to a plurality of plane of the measurement target object and the plane directions of the plurality of planes can be measured stably.

In the present disclosure, a projection pattern to be output by an output unit may be a grayscale pattern or may be a color pattern. In addition, a geometric figure in the projection pattern may be any geometric figure that can be detected and identified in an image. For example, a geometric figure in the projection pattern may be a line, may be a dot, or may be a rectangular or triangular figure or the like. In addition, a geometric figure set according to an exemplary embodiment of the present disclosure refers to a group of geometric figures that are arranged at intervals shorter than a predetermined value. The intervals of the geometric figure sets are longer than the predetermined value.

In the present disclosure, an image acquired by an acquisition unit is an image captured by an imaging apparatus in a state in which a projection pattern is being projected on a measurement target object, and may be any image that is a two-dimensional image. For example, the image may be a grayscale image or may be a color image. In addition, the image may be acquired from the imaging apparatus that has captured the image, may be acquired from images stored in a memory, or may be acquired through a network.

In the present disclosure, a method for detecting a geometric figure by a detection unit may be any method that allows the detection unit to detect a geometric figure in an image. For example, in a case in which the geometric figure is a line, the detection unit may detect the line by labeling edges detected through a Sobel filter, or may detect the line by thinning an image that has been binarized at a predetermined threshold value. Alternatively, in a case in which the geometric figure is a dot, the detection unit may detect the dot by calculating a centroid of an image that has been binarized at a predetermined threshold value, or may detect the dot by carrying out circle detection in an image.

In the present disclosure, a method for determining a geometric figure set by a determination unit may be any method that allows the determination unit to determine, from geometric figures observed in an image, a geometric figure set in a projection pattern. For example, the determination unit may determine a geometric figure set based on the intervals of geometric figures observed in an image. Alternatively, a set determination feature may further be provided in geometric figures, and the determination unit may determine a geometric figure set based on the set determination feature. In this case, the set determination feature may be any feature that allows a set to be determined. As a set determination feature, for example, at least one of the color of a geometric figure, the size of a geometric figure, the shape of a geometric figure, and the position of a code in a geometric figure can be employed. In this case, the determination unit determines a geometric figure set according to whether a set determination feature in a geometric figure observed in an image follows a predetermined rule. Alternatively, the determination unit may determine a geometric figure set according to whether a geometric non-continuous portion of the measurement target object is absent in an image region between geometric figures observed in an image.

In the present disclosure, a method for identifying a geometric figure by an identification unit may be any method that allows the identification unit to identify to which one of the geometric figures in a projection pattern a geometric figure observed in an image corresponds. As identification information to be used for identification, an identification feature provided in a geometric figure may be used. As such an identification feature, for example, a feature that is based on at least one of the color of a geometric figure, the size of a geometric figure, the shape of a geometric figure, and the position of a code in a geometric figure can be employed. In this case, the identification unit according to an exemplary embodiment of the present disclosure identifies a geometric figure observed in an image, based on the aforementioned identification feature. Alternatively, the identification unit according to an exemplary embodiment of the present disclosure may identify a geometric figure by calculating a geometric figure at a predicted position adjacent to the position of a geometric figure observed in an image, based on the predicted position of the geometric figure observed in an image.

In the present disclosure, a distance calculation unit may calculate a distance through any method that allows the distance calculation unit to calculate the distance from a predetermined reference coordinate to a plane of a measurement target object on which a geometric figure is projected. For example, as a method for calculating the distance, a method of calculating the positions of three-dimensional points on a plane of the measurement target object on which the geometric figure is projected may be used. In this case, any method that is based on triangulation may be used.

In the present disclosure, a plane direction calculation unit may calculate a plane direction through any method that allows the plane direction calculation unit to calculate the plane direction of a plane of a measurement target object on which a geometric figure set is projected, based on the distance calculated by the distance calculation unit (distance to a geometric figure set determined by the determination unit). For example, the plane direction calculation unit may calculate the plane direction by forming a triangle mesh based on the distances between three adjacent points in a geometric figure set, or may calculate the plane direction by carrying out plane fitting on the distances between a plurality of pixels within each region of a geometric figure set.

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2014-058314 filed Mar. 20, 2014 and No. 2015-023480 filed Feb. 9, 2015, which are hereby incorporated by reference herein in their entirety.

What is claimed is:

1. An information processing apparatus comprising:
one or more memories that store a set of instructions; and
one or more processors that execute the instructions to:
acquire a captured image of a measurement target object on which a projection pattern is projected, the projection pattern being formed by arranging a plurality of line sets at intervals longer than a predetermined value, each of the plurality of line sets having lines arranged at intervals shorter than the predetermined value;
detect the lines in the projection pattern from the image;
determine the line sets from detected lines;
identify to which one of the lines in the projection pattern a detected line corresponds, based on a result;
calculate a distance from a predetermined reference coordinate to a position on a plane of the measurement target object on which a detected line is projected, based on a position in the image of the detected line and a position in the projection pattern of an identified line; and
calculate a plane direction of a plane of the measurement target object on which a line set is projected, based on a distance calculated at a first point on a first line among the detected lines, a distance calculated at a second point on the first line, and a distance calculated at a third point on a second line belonging to a same line set to which the first line belongs to.

2. The information processing apparatus according to claim 1, wherein the one or more processors execute the instructions to determine whether a certain line and another line located near the certain line form the line set, according to whether an interval between the certain line and the another line located near the certain line is shorter than a predetermined threshold value based on the predetermined value.

3. The information processing apparatus according to claim 1, wherein the line in the projection pattern includes a set determination feature for determining the line set, and
wherein the one or more processors execute the instructions to determine whether a certain line and another line located near the certain line form the line set, according to whether the set determination feature included in the certain line and the set determination feature included in the another line located near the certain line follow a predetermined rule.

4. The information processing apparatus according to claim 3, wherein the set determination feature is at least one of a color of a line, a size of a line, a shape of a line, and a position of a code in a line.

5. The information processing apparatus according to claim 1, wherein the one or more processors execute the instructions to determine whether a certain line and another line located near the certain line form the line set, according to whether a geometric non-continuous portion of the measurement target object is absent in an image region between the certain line and the another line located near the certain line.

6. The information processing apparatus according to claim 1, wherein the line in the projection pattern includes an identification feature based on at least one of a color of a line, a size of a line, a shape of a line, and a position of a code in a line, and
wherein the one or more processors execute the instructions to identify to which one of the lines in the projection pattern a detected line corresponds, by using, as identification information, at least one of the identification feature and a predicted position obtained by predicting at which position in the image the line in the projection pattern is to be observed, and based on the identification information.

7. The information processing apparatus according to claim 1, wherein, when identifying to which one of the lines in the projection pattern a detected line corresponds, the lines to be identified are narrowed down, by using a result of determination of the line sets.

8. The information processing apparatus according to claim 1, wherein the plane direction is a normal direction of a plane.

9. The information processing apparatus according to claim 1, wherein the line is any one of a dot and a polygonal figure.

10. An information processing system comprising:
the information processing apparatus according to claim 1;
a projection apparatus configured to project the projection pattern onto the measurement target object; and
an imaging apparatus configured to capture the image in a state in which the projection pattern is being projected on the measurement target object by the projection apparatus.

11. An information processing method comprising:
acquiring a captured image of a measurement target object on which a projection pattern is projected, the projection pattern being formed by arranging a plurality of line sets at intervals longer than a predetermined value, each of the plurality of line sets having lines arranged at intervals shorter than the predetermined value;

detecting the lines in the projection pattern from the image;

determining the line sets from the detected lines;

identifying to which one of the lines in the projection pattern a detected line corresponds, based on a result in the determining;

calculating a distance from a predetermined reference coordinate to a position on a plane of the measurement target object on which a detected line is projected, based on a position in the image of the detected line and a position in the projection pattern of an identified line; and calculating a plane direction of a plane of the measurement target object on which a determined line set is projected, based on a distance calculated at a first point on a first line among the detected lines, a distance calculated at a second point on the first line, and a distance calculated at a third point on a second line belonging to a same line set to which the first line belongs to.

12. A storage medium storing a program that causes a computer to execute a method comprising:

acquiring a captured image of a measurement target object on which a projection pattern is projected, the projection pattern being formed by arranging a plurality of line sets at intervals longer than a predetermined value, each of the plurality of line sets having lines arranged at intervals shorter than the predetermined value;

detecting the lines in the projection pattern from the image;

determining the line sets from the detected lines;

identifying to which one of the lines in the projection pattern a detected line corresponds, based on a result in the determining;

calculating a distance from a predetermined reference coordinate to a position on a plane of the measurement target object on which a detected line is projected, based on a position in the image of the detected line and a position in the projection pattern of an identified line; and calculating a plane direction of a plane of the measurement target object on which a determined line is projected, based on a distance calculated at a first point on a first line among the detected lines, a distance calculated at a second point on the first line, and a distance calculated at a third point on a second line belonging to a same line set to which the first line belongs to.

* * * * *